United States Patent [19]

Thorne et al.

[11] 4,312,237
[45] Jan. 26, 1982

[54] VORTEX GENERATING DEVICE

[75] Inventors: Glenn A. Thorne; Archie G. Johnson, both of Cedar Rapids, Iowa

[73] Assignee: J-Tec Associates, Inc., Cedar Rapids, Iowa

[21] Appl. No.: 108,196

[22] Filed: Dec. 28, 1979

[51] Int. Cl.³ .............................................. G01F 1/32
[52] U.S. Cl. ................................................ 73/861.22
[58] Field of Search ............ 73/861.22, 861.23, 861.24

[56] References Cited

U.S. PATENT DOCUMENTS

| | | |
|---|---|---|
| 3,116,639 | 1/1964 | Bird . |
| 3,564,915 | 2/1971 | Tomota et al. . |
| 3,572,117 | 3/1971 | Rodley ............................ 73/861.22 |
| 3,683,691 | 8/1972 | Kivenson ........................ 73/861.24 |
| 3,691,830 | 9/1972 | Tomota et al. . |
| 3,722,273 | 3/1973 | Yamasaki et al. . |
| 3,756,078 | 9/1973 | Yamasaki et al. . |
| 3,775,673 | 11/1973 | Watanabe . |
| 3,777,563 | 12/1973 | Yamasaki et al. . |
| 3,823,610 | 7/1974 | Fussell, Jr. . |
| 3,863,500 | 2/1975 | Yamasaki et al. . |
| 3,878,715 | 4/1975 | Kobayashi . |
| 3,878,716 | 4/1975 | Asada . |
| 3,940,986 | 3/1976 | Yamasaki et al. . |
| 3,992,939 | 11/1976 | November . |
| 4,182,165 | 1/1980 | Kita . |

FOREIGN PATENT DOCUMENTS 823684 3/1959 United Kingdom ............. 73/861.24

*Primary Examiner*—Herbert Goldstein
*Attorney, Agent, or Firm*—Griffin, Branigan & Butler

[57] ABSTRACT

A narrow generator plate (10) is immersed parallel to the direction of flow of a fluid stream (14) for generating Karman vortices (54). In one embodiment the generator plate (10) has a shedding section wherein an aperture (26) intersects side surfaces (20) of the generator plate (10) at shedding corners (32). A further embodiment includes a generator member (36) mounted on a leading edge (16) of a generator plate (10) and oriented upstream into the fluid stream.

36 Claims, 19 Drawing Figures

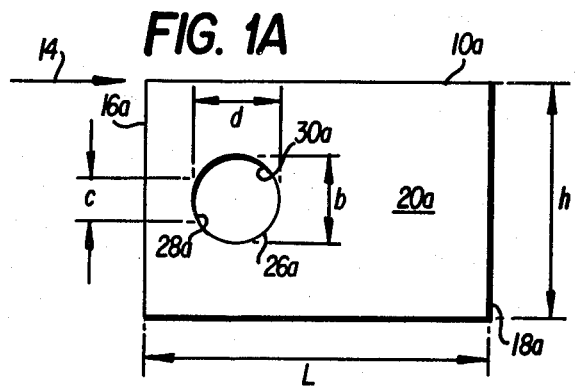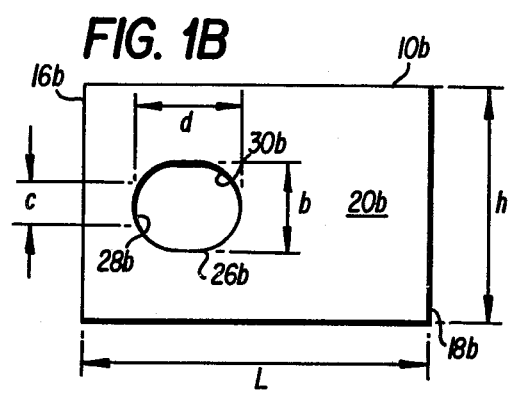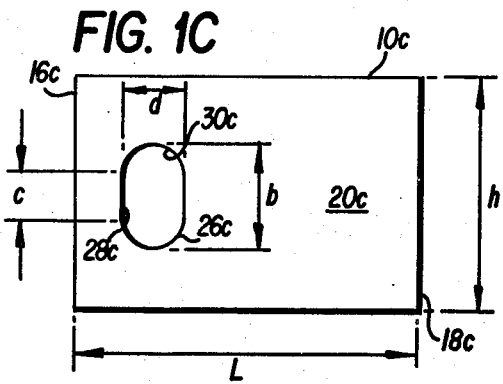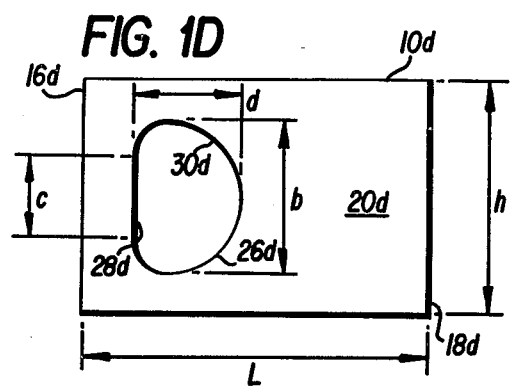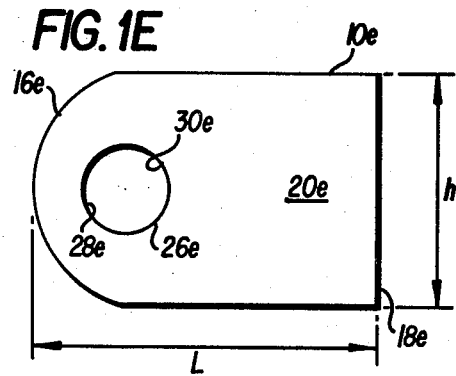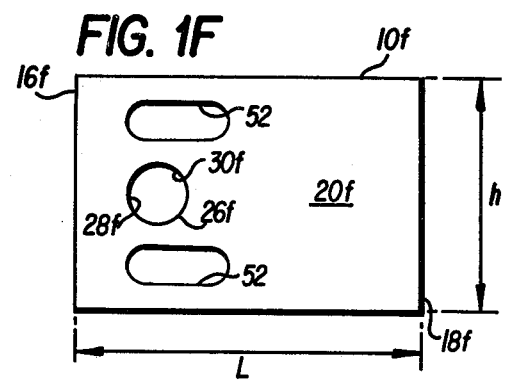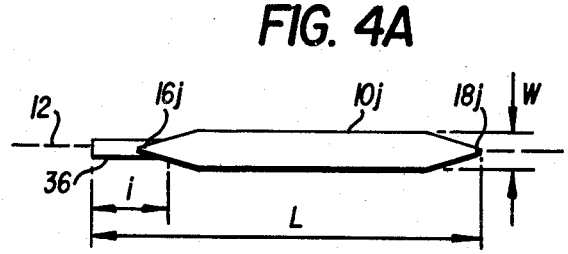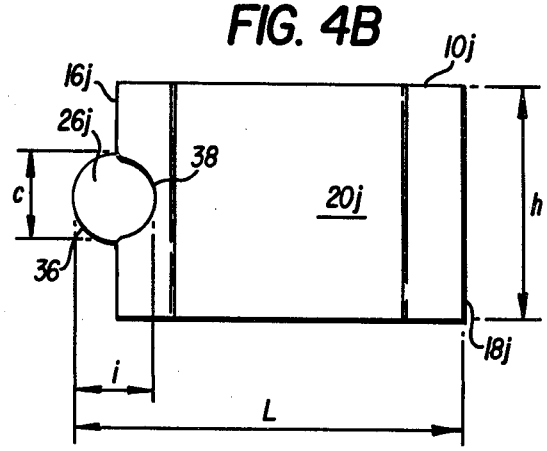

VORTEX GENERATING DEVICE

BACKGROUND OF THE INVENTION

Embodiments of the invention hereinafter described pertain to devices for the generation of Karman vortices.

It is well known that a fluctuation flow field composed of vortices is present in the wake of an object located in a relatively moving fluid. That is, if an object is passing through a fluid, or if the fluid is passing an object, a fluctuating flow field is developed which is composed of vortices which are alternately shed from the sides of the object. This fluctuating flow field is more commonly referred to as a Karman vortex street or trail. As is also known, the rate of generation of vortices in the wake of the object is related to the relative velocity between the object and the fluid stream.

Vortex generators heretofore known in the art include objects having circular, triangular, or rectangular cross-sections. Generally a vortex generator cross-section has a dimension which must be sufficiently large or blunt with respect to one or more other dimensions of the generator in order to produce a stable vortex street. Similarly, when existing vortex generators are located in a confined fluid channel, such as a pipe or the like, often a stable vortex street is produced only when the generator creates a prescribed blockage ratio with respect to the channel. For example, some vortex generators currently marketed preferably operate when blocking 30% of the cross-sectional area of a flow channel.

Unfortunately, while existing vortex generators are thought to be designed to produce as stable a vortex street as possible, the degree of vortex stability and the related accuracy of measurement is inherently limited by the geometrical configurations of the generators employed. In several respects the particular configurations of existing generators create disturbances which result in inaccurate measurements.

In the above regard, it is quite well known that a stagnation region develops on an upstream surface of an object immersed in a relatively moving fluid. The stagnation region constitutes a pressure zone near the upstream surface. The size of the stagnation region, and the magnitude of pressure associated therewith, depends on the configuration of the upstream surface. As the fluid moves relative to the object, the stagnation region tends to shift from side-to-side about the upstream surface, thereby creating pressure differentials which, in turn, effect flow-induced pressure gradients occurring downstream along surfaces of the object. Since the point of detachment of vortices from the immersed object and the timing of the detachment is dependent upon these pressure gradients, the magnitude of the pressure differentials associated with the shifting of the stagnation region is significant. The stagnation region created by the relatively blunt upstream surfaces of existing generators precipitate pressure differentials which cause non-uniformity in the detachment of vortices from the generator. Such non-uniformity results in erroneous measurement of the rate of vortex generation.

The geometrical configurations of existing vortex generators also produce large, turbulent wakes. The more turbulent the wake the greater the pressure drag exerted on the generator and the fluid. The pressure drag undesirably effects the velocity of the fluid and the vortices generated at a rate proportional thereto. Thus, the turbulence caused by existing vortex generators has detrimental impact upon the flow measurements.

Various types of existing flow meters, including flow meters for measuring velocity and/or mass of fluid flow, utilize vortex generating devices to obtain flow measurements. However, many of the vortex generating devices are unable to produce a vortex street of sufficient stability through a wide range of fluid flow rates. As a result, measurements indicate no vortices, or "misses", where vortices should have been detected. (Applicants recognize that vortex "stability" is dependent upon both the strength of formation of the vortices and the sensitivity of the means used for detection of the vortices. As used herein, however, "stability" pertains to the quality of vortices with reference to a given, or constant, detection means. That is, the production of sufficiently well-formed vortices in a sequence indicative of fluid flow.) The instability of the vortex streets produced by existing generators requires that vortex counting measurements be averaged over a sufficiently long time period in order to obtain an accurate indication of flow rate. The longer time interval required for averaging, results in a less accurate measurement for instantaneous flow.

Therefore, an object of embodiments of the invention hereinafter described is the provision of a device for generating stable vortices.

An advantage of these the embodiments is the reliable production of stable vortices without a significant non-flow induced pressure differential in the region of the vortex generating device.

A further advantage associated with the embodiments of the invention is the accurate measurement of the rate of generation of Karman vortices.

SUMMARY

In accordance with principles of this invention, numerous structural embodiments are provided for the generation of Karman vortices. According to one embodiment, a vortex generating device includes a narrow generator plate which is immersed in a fluid flow to generate Karman vortices. The generator plate is oriented with an axis of elongation parallel to the direction of flow of the fluid stream. The generator plate has side surfaces essentially parallel to the direction of fluid flow. The side surfaces have a shedding region therein forming shedding corners at which vortices detach from the generator plate. Various further embodiments separately illustrate differing shapes for a leading edge and the shedding region of the generator plate.

According to another embodiment, a generator member is mounted on a leading edge of the generator plate. The generator member is oriented upstream parallel to the axis of elongation of the generator plate.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 1A through 1F are side views of vortex generating devices according to various embodiments of the invention;

FIGS. 4A and 4B are top and side views, respectively, of one embodiment of the invention;

DETAILED DESCRIPTION OF THE DRAWINGS

Figure 2A:
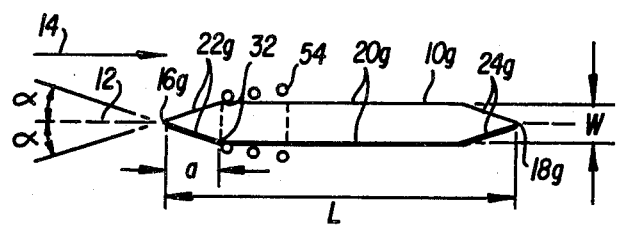
FIGS. 2A through 2C are top views of vortex generating devices according to various embodiments of the invention.
Figure 2B:
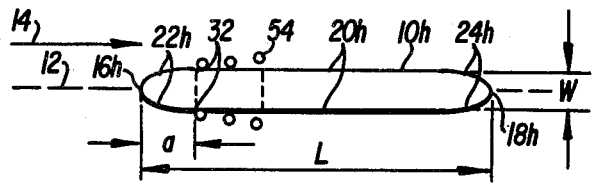
Figure 2C:
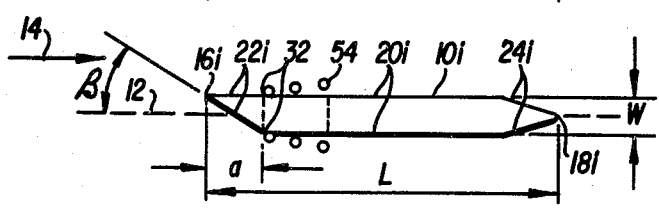

FIGS. 1A through 1F illustrate vortex generating devices (such as generator plates 10a through 10f) according to various embodiments of the invention. FIGS. 2A through 2C, in addition to illustrating a top view of further embodiments of the invention (comprising generator plates 10g, 10h, and 10i), also selectively illustrate an axis of elongation 12 associated with each generator plate 10 of the various embodiments disclosed herein. The axis of elongation 12, and hence each generator plate 10, is oriented parallel to the direction of fluid flow as indicated by arrow 14 (from left to right). It should be understood that, with the exception of FIGS. 3A, 3B, and 5B, in each of the Figures the fluid flows in a direction from the left to the right.

The generator plate 10 of the invention may be fabricated from any suitable material or combinations of material, including plastic or metal. While the generator plate 10 may be mounted in a free standing aerodynamic configuration, it should also be understood that each embodiment of the invention may also be incorporated into a bounded fluid stream, such as a pipe or the like.

With respect to the direction of flow, each generator plate has a leading edge 16 and a trailing edge 18. When projected onto the axis of elongation 12, the leading edge 16 of plate 10 is separated from the trailing edge 18 by a length dimension L. As seen in FIGS. 2A through 2C, each generator plate 10 also has a width W which is essentially perpendicular to the axis of elongation 12. The generator plate 10 is a narrow, elongated member such that the ratio L:W is preferably in the range of 15:1 to 30:1. A L:W ratio in this range gives the generator device a streamlined shape which reduces the turbulence of the resultant wake and the pressure drop associated therewith.

Each generator plate 10 has two side surfaces 20 which extend from the leading edge 16 to the trailing edge 18. Although the side surfaces 20 are predominantly parallel to the axis of elongation 12 as viewed in FIGS. 2A through 2C, the side surfaces 20 include leading portions 22 and trailing portions 24 (defined with respect to the direction of flow as indicated by arrow 14) which are not necessarily parallel to the axis 12. In this respect, FIGS. 2A, 2B, and 2C each show separate embodiments having different configurations for the leading portions 22 of the side surfaces 20.

In the embodiment of FIG. 2A the leading portions 22g of side surfaces 20g are essentially straight lines as viewed from above and intersect the axis of elongation 12 at an angle alpha $\alpha$ preferably in the range from 5° to 30°, thereby forming the leading edge 16g.

In the embodiment of FIG. 2B the leading portions 22h of the side surfaces 20h gradually taper inwardly to form the leading edge 16g.

In the embodiment of FIG. 2C a leading portion 22i remains substantially parallel to the axis of elongation 12 while leading portion 22i' intersects leading portion 22i at an angle beta $\beta$ which is preferably in the range from 5° to 30°.

A height dimension h which is orthogonal to both the length dimension L and the width dimension W is illustrated for each of the embodiments of FIGS. 1A through 1F. In this respect, the leading edge 16 of each generator plate 10 of the invention may have a leading edge 16 which is essentially straight with respect to the height dimension h or, as illustrated in FIG. 1E, may have a leading edge 16e which is curved with respect to the height h.

The generator plates 10 of the different embodiments of the invention have a shedding section comprising an aperture 26 which intersects the side surfaces 20 and extend into the plate 10 along the width dimension W. In this regard, the aperture 26 may be a suitable indentation on the side surface 20 or the aperture 26 may extend completely through the plate 10.

Although the aperture 26 may take on numerous geometrical shapes as hereinafter exemplified with reference to the embodiments of FIGS. 1A through 1D, the aperture 26 of each embodiment has a leading aperture edge 28 and a trailing aperture edge 30 with respect to the direction of flow as indicated by arrow 14. The leading aperture edges 28 intersect the side surfaces 20 of the plate 10 to form shedding corners 32 which are preferably sharp as seen from above in FIGS. 2A through 2C. As seen from the side in FIGS. 1A through 1D, however, the leading aperture edges 28 are preferably a continuous curve without any sharp discontinuities.

As indicated above, the aperture 26 may take on several exemplary geometrical configurations as illustrated in FIGS. 1A through 1D. The embodiment of FIG. 1A shows a circular aperture 26a; the embodiment of FIG. 1B shows a substantially eliptical aperture 26b having its major axis parallel to the axis of elongation 12; the embodiment of FIG. 1C illustrates a substantially elliptical aperture 26c having a major axis perpendicular to the axis of elongation 12; and, the embodiment of FIG. 1B illustrates a substantially "D"-shaped aperture 26d with a relatively straight leading edge 28d smoothly tapered at its extremes for intersecting the substantially arcuate trailing aperture edge 30d.

FIGS. 1A through 1D show a distance d which is the greatest distance from the leading aperture edge 28 to the trailing aperture edge 30. That is, distance d is the distance from the most upstream portion of edge 28 to the most downstream portion of edge 30. With respect to the width W of the plate 10, a ratio d:W is preferably in the range of 5:1 to 15:1.

In each of the embodiments of FIGS. 1A through 1D the shedding corners 32 effectively extend along the leading aperture edge 28 for only a portion thereof, such that the effective shedding length of the leading aperture edge 28 (as projected on the height dimension (h) is a length c. Although length c varies with each embodiment, it is believed that in each embodiment c should be less than the length of the projection of the leading aperture edge 28 on the height dimension h (denoted as b). When the portions of leading aperture edge 28 not included within the distance c are smoothly tapered as illustrated, these portions of the leading aperture edge 28 advantageously tend to minimize the turbulence. With respect to the width W of the plate 10, a ratio c:W is preferably in the range of 5:1 to 9:1.

The distance from the furthest upstream point of the leading aperture edge 28 must be sufficiently downstream from the leading edge 16 of plate 20 in order to accommodate the leading portions 22 of the side surfaces 20. In this respect, the leading portions 22 have a length a (as projected on the axis of elongation 12) such that the ratio of the length a to the width W (a:W) should preferably be less than 5:1 and more preferably less than 3:1 to minimize variations caused by kinematic viscosity effects (such as changing pressure, temperature, and humidity in the fluid).

Figure 3A:
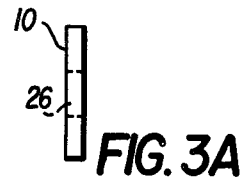
FIG. 3A is a front view of a vortex generating device according to one embodiment of the invention.
Figure 3B:
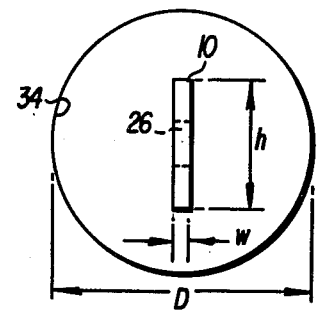
FIG. 3B is a front view of the device of FIG. 3A inserted into a flow channel.

As previously mentioned, any of the embodiments of the invention described herein may be utilized as a free standing aerodynamical configuration (as illustrated in FIG. 3A) or may be incorporated into a flow channel (such as a pipe 34 as seen in the front cross-sectional view of FIG. 3B). With particular regard to the latter, although the flow channel 34 of FIG. 3B is shown as a pipe with a circular cross-section of diameter D, it should be understood that many geometrical configurations may be used for the channel 34. The generator plate 10 of FIG. 3B has a channel blockage area equal to the product of its height h times the width W. Unlike existing vortex generators employed in comparable channel flow meters, the generator plate 10 of the various embodiments of the invention may operate while blocking less than 1/5 of the cross-sectional area of the channel 34, and may preferably operate while blocking less than 1/15 of the channel 34. Yet, the generator plate 10 of the various embodiments of the invention produces reliably stable vortices through a wide range of flow velocities.

As mentioned hereinbefore, although the side surfaces 20 of the generator plate are essentially parallel to the axis of elongation 12, a trailing portion 24 of the side surfaces 20 tapers inwardly to the trailing edge 18 of the plate 10. In this respect, the taper may be very gradual as shown with respect to trailing portions 24h of FIG. 2B; or, the trailing portions may be sharp as illustrated by trailing portions 24g of FIG. 2A.

FIGS. 4A and 4B illustrate an additional embodiment of the invention wherein a generator plate 10j has side surfaces 20j spanning a leading edge 16j and a trailing edge 18j. A generator member 36, preferably a wire, is mounted on the leading edge 16j of generator plate 10j so as to extend upstream along the axis of elongation 12. A greatest distance i from the generator member 36 to the leading edge 16j as projected on the axis of elongation 12 is such that the ratio i:W is in the range of 5:1 to 15:1. As shown in FIG. 4B, the member 36 is preferably arcuate so as to be attached to leading edge 16j at two points. However, it should be understood that member 36 may assume various geometrical configurations, including that of a substantially linear segment.

When the leading edge 16j is formed with a dimple 38 as shown in FIG. 4B, the arcuate member 36 and dimple 38 circumscribe an aperture 26j of which the generator member 36 is a leading aperture edge and the dimple 38 is a trailing aperture edge. A greatest distance i from the generator member 36 to the leading edge 16j as projected member on the axis of elongation 12 is such that the ratio i:W is in the range of 5:1 to 15:1.

In many respects the embodiments illustrated by FIGS. 4A and 4B are similar to the embodiments previously described. For example, the dimensional ratios discussed above are applicable to the FIG. 4A and 4B embodiments when considering the length dimension L to extend from the furthermost upstream portion of the generator member 36 to the trailing edge 18j. Also, for example, the leading edges 16j and the trailing edges 18j may be tapered in any of the above-described manners.

Figure 5A:
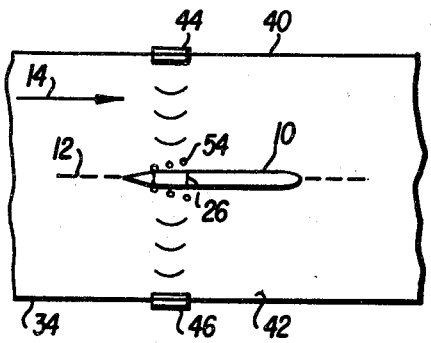
FIGS. 5A and 5B are top and front views of a vortex generating device according to an embodiment of the invention wherein a generating device is inserted into a flow channel between a transmitting means and a receiving means mounted in the channel.
Figure 5B:
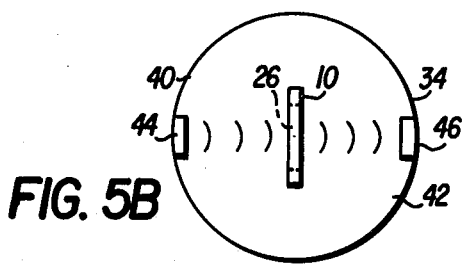

The embodiments of the invention may conveniently employ various types of sensors positioned in numerous arrangements. For example, FIGS. 5A and 5B illustrate the generator plate 10 positioned in a flow channel 34 such that the axes of elongation 12 of generator plate 10 is parallel to the direction of the fluid flow as indicated by arrow 14. Although FIG. 5B illustrates flow channel 34 having a circular cross-section, it should be understood that the flow channel 34 may be any appropriate channel.

Flow channel 34 of FIGS. 5A and 5B has a first channel wall 40 and a second channel wall 42 which are both parallel to the direction of fluid flow and which face each other. Mounted in the first channel wall 40 is a transmitting transducer 44; mounted in the second channel wall 42 is a receiving transducer 46. The transducers 44, 46 are mounted on the opposing channel walls such that a signal travelling between the transducers 44, 46 would pass through the aperture 26 of the generator plate 10. The transmitting transducer 44 and the receiving transducer 46 are connected to suitable electrical circuitry for determining the relative velocity between the fluid stream and the generator plate 10. In this respect, U.S. Pat. No. 3,680,375 to Joy et al. is incorporated herein by reference as an example of the suitable electrical circuitry compatible with the embodiments of this invention.

Figure 6A:
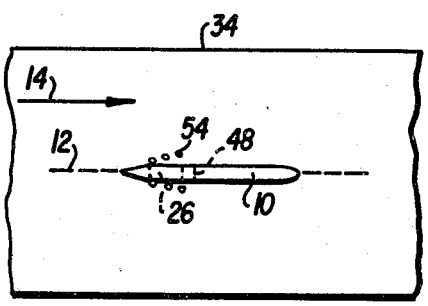
FIGS. 6A and 6B are top and side views, respectively, of a vortex generating device according to an embodiment of the invention having a sensor mounted on a trailing aperture edge; and, FIGS. 7A and 7B are top and front views, respectively, of a vortex generating device according to an embodiment of the invention having sensing means mounted on a downstream portion of the device.
Figure 6B:
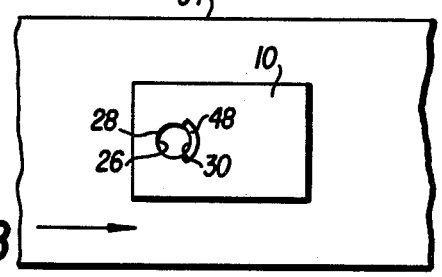
Figure 7A:
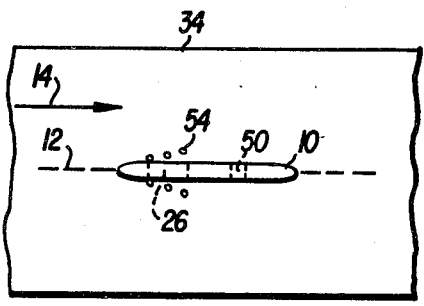
Figure 7B:
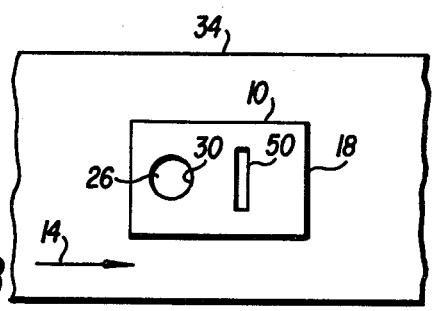

FIGS. 6A and 6B illustrate a further embodiment of the invention wherein a sensor 48 is mounted on the trailing aperture edge 30 of the generator plate 10. The embodiments of FIGS. 7A and 7B illustrate the mounting of a sensor 50 on a portion of the generator plate 10 between the trailing aperture edge 30 and the trailing edge 18 of the generator plate 10.

Various sensor devices may be used for the sensors of the FIGS. 6 and 7 embodiments. For example, the sensors 48 and/or 50 may be hot-wire devices or capacitance devices. While the generator plates 10 of the FIGS. 6 and 7 embodiments are illustrated as positioned within a flow channel 34, it should again be understood that these embodiments may also be free-standing aerodynamical configurations.

The embodiment of FIG. 1F comprises a generator plate 10f which may combine one or more of the features of the above-described embodiments. In addition, the FIG. 1F embodiment has surface discontinuities 52 on each side surface 20f. The feature of surface discontinuities is set forth in U.S. patent application Ser. No. 108,066, filed Dec. 28, 1979 by Mahany et al., commonly assigned, and incorporated herein by reference. While the surface discontinuities 52 may take various forms, such as raised or elevated portions, the FIG. 1F illustration depicts the surface discontinuities as holes extending through the width W of plate 10f.

In operation, each of the generator plates 10 according to the different embodiments of the invention is oriented so that its axis of elongation 12 is parallel to the direction of fluid flow as indicated by arrow 14. As the fluid flows, the essentially sharp leading edge 16 of the generator plate 10 configured according to either of the FIG. 2A, FIG. 2B, or 2C, embodiments prevents the formation of a sizeable stagnation area on the upstream surface of the plate 10. Hence, the pressure changes associated with the shifting of the stagnation region is reduced and the effect thereof on the pressure gradients influencing vortex detachment is minimized.

After the fluid has flowed around the leading portions 22 of side surfaces 20 in a laminar fashion, vortices (labeled 54 in the various figures) detach from the generator plate 10 at the shedding corners 32 which lie along the leading aperture edge 28 of the aperture 26. The preferably sharp corners 32 of the leading aperture edge 28 permit the formation of well-formed, stable vortices. The vortices detach from the leading aperture edge 28 along a shedding height which, when projected on a plane perpendicular to the side surfaces 20 of the plate 10, has a length c which is preferably less than the height b of the aperture 26. Since the extremities of the leading aperture edge 28 are essentially continuous curves without sharp discontinuities, minimum turbulence is produced at the extremities and vortices are generated only along the portion of the leading aperture edge 28 corresponding to the distance c.

After the vortices detach from the shedding corners 32, one or more sensors positioned in either of the above-described configurations detect the rate of generation of the vortices. In the embodiment of FIG. 5A and FIG. 5B, for example, the transmitting transducer 44 directs a signal, such as a sonic signal, towards vortices 54 in the vicinity of the aperture 26. The receiving transducer 46 receives a signal modulated by the vortices and uses the signal as an indication of the relative velocity of the fluid in the manner described in the Joy et al. '375 patent. The various embodiments of the invention may be utilized with numerous types of sensors in the manners hereinbefore described, including sensors for measurements of velocity and/or mass flow. In this respect, the sensors mounted on the generator plate 10 may be sensors for determining parameters other than the rate of vortex generation.

The narrow, elongate shape of the generator plate 10 generally provides a laminar flow in the region near the shedding corners 32. The portion of generator plate 10 extending from the trailing aperture edge 30 to the trailing edge 18 acts to separate the two sides of the vortex street thereby preventing interaction of the vortices following detachment. It is thought that the side surfaces 20 downstream from the trailing aperture edge 30 dissipate the vortices by viscous action, thus reducing the effect of the vortex street on the whole flow stream. This effect is believed to be responsible for the reduced pressure drop of the generator plate 10 as compared to prior art shedding objects.

The trailing portions 24 of the surfaces 20 are tapered to reduce the magnitude of turbulent shedding from the rear of the generator plate 10. This has the practical effect of reducing the pressure drop and eliminating audible noises (such as whistles) which would normally be associated with a blunt termination.

The operation of the FIGS. 4A and 4B embodiments closely resembles that described above except that the generator member 36 is the furthest upstream portion of the generator plate 10j. Accordingly, the narrow generator element 36 does not produce a sizable stagnation region and promptly sheds vortices, thereby forming a vortex street. Again, sensors may be mounted in a variety of configurations, including a variation of FIG. 4B wherein generator plate 10j may be mounted in a flow channel (in the manner of the embodiment of FIG. 5A and FIG. 5B) so that a signal may be transmitted through the vortex street in the vicinity of the aperture 26j. Also, a sensor may be mounted on leading edge 16j.

While the invention has been particularly shown and described with reference to the preferred embodiments thereof, it will be understood by those skilled in the art that various alterations in form and detail may be made therein without departing from the spirit and scope of the invention.

The embodiments of the invention in which an exclusive property or privilege is claimed are defined as follows:

1. A device for generating Karman vortices in a fluid stream, said device comprising:
   a narrow, elongate plate member having an axis of elongation parallel to the direction of flow of said fluid stream, said elongate plate member having side surfaces essentially parallel to said direction of flow, said elongate plate member also having at least one aperture, and wherein said aperture intersects at least one said side surface to form at said side surface a leading aperture edge with respect to said direction of flow such that said leading aperture edge forms a shedding corner for the generation of vortices.

2. The device of claim 1 wherein said aperture extends substantially through said plate member.

3. The device of claim 1, wherein said device is located in a flow channel such that said axis of elongation of said plate member is parallel to said direction of flow, and wherein said device blocks less than 20 percent of the cross-sectional area of the flow channel in a plane perpendicular to the direction of flow.

4. The device of claim 1, wherein said side surfaces of said plate member have leading portions with respect to said direction of flow, wherein said leading portions of said side surfaces of said plate member intersect so as to form an essentially sharp leading edge of said plate and wherein said leading portions of said side surfaces gradually taper inwardly to said leading edge.

5. The device of claim 1, wherein said side surfaces of said plate member have leading portions with respect to said direction of flow, and wherein said leading portions of said side surfaces intersect said axis of elongation at a specified angle.

6. The device of claim 1, wherein said side surfaces of said plate member have leading portions with respect to said direction of flow, wherein a leading portion of one side surface intersect a leading portion of a second side surface at a specified angle.

7. The device of claim 4, 5 or 6 wherein said elongate plate member has a width W perpendicular to said axis of elongation, and wherein the leading portion of a side surface of said plate member has a length a as projected on said axis of elongation such that the ratio a:W is less than 5:1.

8. The device of claim 1 wherein said leading aperture edge is essentially a continuous curve in a plane containing said side surface.

9. The device of claim 8 wherein said leading aperture edge is substantially arcuate in the plane of said side surfaces.

10. The device of claim 8 wherein said aperture is circular.

11. The device of claim 8 wherein said aperture is substantially an ellipse having a major axis parallel to said axis of elongation of said plate member.

12. The device of claim 8 wherein said aperture is substantially an ellipse having a minor axis parallel to said axis of elongation of said plate member.

13. The device of claim 12 wherein said plate member has an axis of height perpendicular to said axis of elongation and yet parallel to said side surface of said plate member, wherein said leading aperture edge has extremities projected along said axis of height, and wherein said leading aperture edge extremities are formed so as to generate substantially no turbulence.

14. The device of claim 1 wherein said elongate plate member has a width W perpendicular to said axis of elongation, and wherein a greatest distance d from said leading aperture edge to said trailing aperture edge along said axis of elongation is such that the ratio of d:W is in the range of 5:1 to 15:1.

15. The device of claim 1 wherein a portion of said elongate plate member from said trailing aperture edge to said plate member trailing edge has mounted thereon a sensor.

16. The device of claim 1 wherein said trailing aperture edge has mounted thereon a sensor.

17. The device of claim 1, wherein an effective vortex generating portion of said leading aperture edge has a length c as projected on a plane perpendicular to said side surfaces, wherein said elongate plate member has a width W perpendicular to said axis of elongation, and wherein the ratio c:W is in the range of 5:1 to 9:1.

18. The device of claim 1 wherein said elongate plate member has a leading edge with respect to said direction of flow, and wherein the projection of said leading edge on a plane parallel to said side surface is essentially a straight line.

19. The device of claim 1 wherein said elongate plate member has a leading edge with respect to said direction of flow, and wherein the projection of said leading edge on a plane parallel to said side surface is essentially a curve.

20. A device for generating Karman vortices in a fluid stream, said device comprising:
a narrow elongate plate member having an axis of elongation parallel to the direction of flow of said fluid stream, said elongate plate member having side surfaces essentially parallel to said direction of flow, wherein said side surfaces of said plate member have leading portions thereof with respect to said direction of flow, wherein said leading portions of said side surfaces intersect so as to form a leading edge of said plate member, said leading portions of said plate member intersecting to form an essentially sharp leading edge of said plate, and wherein said leading portions of said side surfaces gradually taper inwardly to said leading edge; and,
a generator member connected to at least one point of said leading edge of said plate member and oriented upstream with respect to said direction of flow for the generation of Karman vortices.

21. The device of claim 20, wherein said leading portions of said plate member intersection so as to form an essentially sharp leading edge of said plate, wherein said leading portions of said side surfaces gradually taper inwardly to said leading edge, and wherein said leading portions of said side surfaces intersect said axis of elongation at a specified angle.

22. The device of claim 20 wherein said leading portions of said plate member intersect so as to form an essentially sharp leading edge of said plate, wherein said leading portions of said side surfaces gradually taper inwardly to said leading edge, and wherein a leading portion of one said surface intersect a leading portion of a second side surface at a specified angle.

23. The device of claims 21 or 22, wherein said elongate plate member has a width W perpendicular to said axis of elongation, and wherein a leading portion of a side surface of said plate member has a length a as projected on said axis of elongation such that the ratio a:W is less than 5:1.

24. The device of claim 20, wherein said generator member is connected to said leading edge of said plate member at two points, and wherein said generator member is substantially arcuate.

25. The device of claim 24, wherein said leading edge of said plate member has a substantially arcuate portion in a plane containing said leading edge and said generator member, and wherein said generator member and said leading edge form an aperture.

26. The device of claim 1 or 25, wherein said device is located in a flow channel comprising channel walls parallel to said direction of flow, and wherein at least one of said channel walls has mounted therein a sensor for directing a signal through said aperture.

27. The device of claim 26, wherein each of said channel walls have mounted therein a transducer, a first such channel wall having mounted therein a transmitting transducer and a second such channel wall having mounted therein a receiving transducer, wherein said transmitting transducers directs a sonic signal toward vortices formed near said aperture, and wherein said receiving transducer receives a sonic signal modulated by said vortices.

28. The device of claim 25, wherein said plate member has a width W perpendicular to said axis of elongation, and wherein a greatest distance i from said generator member to said leading edge as projected on said axis of elongation is such that the ratio i:W is in the range of 5:1 to 15:1.

29. The device of claim 20, wherein said plate member has a width W perpendicular to said axes of elongation, and wherein the greatest distance i from said generator member to said leading edge as projected on said axis of elongation is such that the ratio i:W is in the range of 5:1 to 15:1.

30. The device of claim 20, wherein said plate member has a sensor mounted thereon.

31. The device of claims 15, 16, 29, or 30 wherein said sensor detects Karman vortices.

32. The device of claim 30, wherein said sensor is mounted on said leading edge of said plate member.

33. The device of claim 20, wherein said generator member is a wire.

34. The device of claim 20, wherein an effective vortex generating portion of said generator element has a length c as projected on a plane perpendicular to said side surfaces, wherein said plate member has a width W perpendicular to said axis of elongation, and wherein the ratio c:W is in the range of 5:1 to 9:1.

35. The device of claims 1 or 20 wherein said elongate plate member has a width perpendicular to said axis of elongation, wherein said plate member has a length L as projected on said axis of elongation, and wherein the ratio L:W is in the range of 15:1 to 30:1.

36. The device of claims 1 or 20, wherein said side surfaces of said elongate plate member have trailing portions with respect to said direction of flow, and wherein said trailing portions of said side surfaces are tapered toward one another.

* * * * *